(12) United States Patent
Kim

(10) Patent No.: US 12,235,514 B2
(45) Date of Patent: Feb. 25, 2025

(54) LIQUID LENS CONTROL DEVICE

(71) Applicant: LG INNOTEK CO., LTD., Seoul (KR)

(72) Inventor: Chang Wook Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 554 days.

(21) Appl. No.: 17/625,661

(22) PCT Filed: Jul. 7, 2020

(86) PCT No.: PCT/KR2020/008837
§ 371 (c)(1),
(2) Date: Jan. 7, 2022

(87) PCT Pub. No.: WO2021/006592
PCT Pub. Date: Jan. 14, 2021

(65) Prior Publication Data
US 2022/0229264 A1    Jul. 21, 2022

(30) Foreign Application Priority Data
Jul. 9, 2019    (KR) .................. 10-2019-0082855

(51) Int. Cl.
*G02B 7/04* (2021.01)
*G02B 3/14* (2006.01)
*G02B 27/64* (2006.01)

(52) U.S. Cl.
CPC .............. *G02B 7/04* (2013.01); *G02B 3/14* (2013.01); *G02B 27/646* (2013.01)

(58) Field of Classification Search
CPC ..................................... G02B 7/04; G02B 3/14
(Continued)

(56) References Cited

U.S. PATENT DOCUMENTS 11,567,242 B2 *   1/2023   Kaminski ................ G02B 3/14
2007/0146893 A1   6/2007   Kuiper et al.
(Continued)

FOREIGN PATENT DOCUMENTS

JP    2006-330321 A    12/2006
JP    2008-519300 A    6/2008
(Continued)

*Primary Examiner* — Stephone B Allen
*Assistant Examiner* — Boutsikaris Leonidas
(74) *Attorney, Agent, or Firm* — Birch, Stewart, Kolasch & Birch, LLP

(57) ABSTRACT

A liquid lens control device according to one embodiment comprises: a liquid lens in which a liquid interface is controlled in response to a plurality of individual voltages applied to each of a plurality of individual electrodes; a control unit for controlling the plurality of individual voltages; and a compensation unit for compensating for characteristics of at least one individual electrode from among the plurality of individual electrodes. The characteristic compensated for by the compensation unit can be the position of the interface according to the individual voltage applied to the individual element. The compensation unit can perform the compensation by using a first ADC value acquired when a first voltage is applied to each of the plurality of individual electrodes, and a second ADC value acquired when a second voltage that differs from the first voltage is applied to each of the plurality of individual electrodes.

18 Claims, 5 Drawing Sheets

(58) Field of Classification Search
USPC .......................................................... 359/665
See application file for complete search history.

(56) References Cited

U.S. PATENT DOCUMENTS

| | | |
|---|---|---|
| 2009/0135484 A1 | 5/2009 | Weber et al. |
| 2010/0040355 A1 | 2/2010 | Craen et al. |
| 2019/0310490 A1 | 10/2019 | Park et al. |
| 2020/0096678 A1* | 3/2020 | Kaminski ............ G02B 3/0006 |
| 2022/0057546 A1* | 2/2022 | Dale .................... G02B 26/005 |

FOREIGN PATENT DOCUMENTS

| | | | |
|---|---|---|---|
| KR | 10-1158706 B1 | 6/2012 | |
| KR | 10-2018-0114803 A | 10/2018 | |
| WO | WO-2018187587 A2 * | 10/2018 | ......... G02B 13/0075 |

* cited by examiner

LIQUID LENS CONTROL DEVICE

CROSS REFERENCE TO RELATED APPLICATIONS

This application is the National Phase of PCT International Application No. PCT/KR2020/008837, filed on Jul. 7, 2020, which claims priority under 35 U.S.C. 119(a) to Patent Application No. 10-2019-0082855, filed in the Republic of Korea on Jul. 9, 2019, all of which are hereby expressly incorporated by reference into the present application.

TECHNICAL FIELD

Embodiments relate to a liquid lens control device.

BACKGROUND ART

People who use portable devices demand optical devices that have high resolution, are small, and have various photographing functions. For example, the various photographing functions may include at least one of an optical zoom-in/zoom-out function, an auto-focusing (AF) function, or a hand-tremor compensation or optical image stabilization (OIS) function.

Conventionally, the aforementioned various photographing functions are realized by combining a plurality of lenses and directly moving the combined lenses. In the case in which the number of lenses is increased, however, the size of an optical device may increase.

The AF function and the hand-tremor compensation function are performed by moving or tilting a plurality of lenses, which are fixed to a lens holder and are aligned with an optical axis, in the optical-axis direction or in a direction perpendicular to the optical axis. To this end, a separate lens-moving apparatus is used to move a lens assembly constituted by a plurality of lenses. However, the lens-moving apparatus consumes a lot of power, and an additional cover glass needs to be provided separately from a camera module in order to protect the lens-moving apparatus, thus leading to an increase in the overall size of the conventional camera module. In order to solve this, research has been conducted on a liquid lens configured to electrically adjust the curvature of an interface between two types of liquids in order to perform the AF function and the hand-tremor compensation function.

Also, research with the goal of improving spatial frequency response (SFR) and an OIS suppression ratio by precisely controlling a liquid lens has been conducted.

DISCLOSURE

Technical Problem

Embodiments provide a liquid lens control device capable of precisely controlling a liquid lens in order to improve spatial frequency response and an OIS suppression ratio without increasing the size thereof.

The objects to be accomplished by the embodiments are not limited to the above-mentioned objects, and other objects not mentioned herein will be clearly understood by those skilled in the art from the following description.

Technical Solution

A liquid lens control device according to an embodiment may include a liquid lens configured to control the interface between liquids in response to a plurality of individual voltages applied to respective ones of a plurality of individual electrodes, a controller configured to control the plurality of individual voltages, and a compensator configured to compensate for the characteristic of at least one individual electrode among the plurality of individual electrodes.

For example, the characteristic compensated for by the compensator may be the position of the interface according to the individual voltage applied to the individual electrode.

For example, the compensator may perform compensation using a first ADC value, acquired when a first voltage is applied to each of the plurality of individual electrodes, and a second ADC value, acquired when a second voltage, which is different from the first voltage, is applied to each of the plurality of individual electrodes.

For example, the compensator may perform compensation using the slope of the straight line connecting the first ADC value corresponding to the first voltage and the second ADC value corresponding to the second voltage for each of the plurality of individual electrodes.

For example, the compensator may include a single compensator, and the single compensator may compensate for the characteristic.

For example, the compensator may include a plurality of compensators that respectively correspond to the individual electrodes, and each of the plurality of compensators may compensate for the characteristic of the individual electrode corresponding to each of the compensators.

For example, the compensator may calculate a plurality of first slopes, each of which is the slope of an ADC value corresponding to the position of the interface between the liquids in the liquid lens with respect to the individual voltage for each of the plurality of individual electrodes, may calculate a reference slope using at least two of the plurality of first slopes, and may correct at least one first slope, among the plurality of first slopes, using the reference slope. One of the at least one first slope may be the slope having the largest deviation from the reference slope.

For example, the reference slope may be the average value of the remaining slopes, other than the slope having the largest deviation, among the plurality of first slopes.

For example, the liquid lens control device may include a first driving voltage generator configured to generate an individual voltage that is applied to an individual electrode having at least one corrected first slope among the plurality of first slopes, a second driving voltage generator configured to generate an individual voltage that is applied to an individual electrode having the remaining slope, other than the at least one corrected first slope, among the plurality of first slopes, and a compensator configured to multiply a plurality of individual voltages generated by the first and second driving voltage generators by the same compensation gain and to apply the result of multiplication to the plurality of individual electrodes.

Advantageous Effects

A liquid lens control device according to an embodiment is capable of correcting variation in the response of a liquid lens for voltages applied to individual electrodes, thereby more accurately driving the liquid lens.

However, the effects achievable through the embodiments are not limited to the above-mentioned effects, and other effects not mentioned herein will be clearly understood by those skilled in the art from the following description.

BEST MODE

Figure 1:
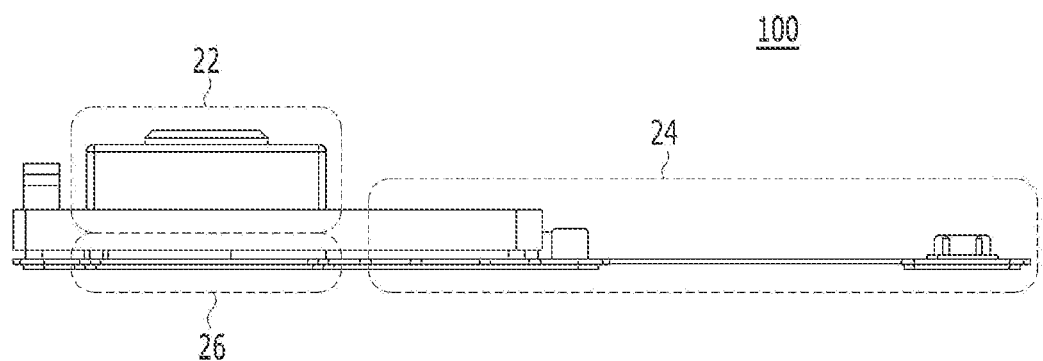
FIG. 1 is a schematic cross-sectional view of a camera module according to an embodiment.

Hereinafter, exemplary embodiments of the present disclosure will be described in detail with reference to the accompanying drawings.

The examples, however, may be embodied in many different forms, and should not be construed as being limited to the embodiments set forth herein. Rather, within the spirt and scope of the present disclosure, one or more components may be selectively and operatively combined or substituted.

Unless otherwise defined, all terms used herein (including technical and scientific terms) have the same meanings as commonly understood by those skilled in the art. It will be further understood that terms, such as those defined in commonly used dictionaries, should be interpreted as having meanings consistent with their meanings in the context of the relevant art.

Terms used in the embodiments of the present disclosure are provided for description of the embodiments, and the present disclosure is not limited thereto. In the specification, singular forms in sentences include plural forms unless otherwise noted. The meaning of "at least one of A, B, or C (or one or more of A, B, and C)" may be one or more combinations among all possible combinations that can be obtained from A, B, and C.

Additionally, terms such as "first", "second", "A", "B", "(a)", "(b)", etc. may be used herein to describe the components of the embodiments of the present disclosure. These terms are only used to distinguish one element from another element, and the essence, order, or sequence of corresponding elements is not limited by these terms.

It should be noted that if it is described in the specification that one component is "connected", "coupled", or "joined" to another component, the former may be directly "connected", "coupled", or "joined" to the latter, or may be indirectly "connected", "coupled", or "joined" to the latter via another component interposed therebetween.

It will be understood that when an element is referred to as being "on" or "under" another element, it can be directly on/under the element, or one or more intervening elements may also be present. When an element is referred to as being "on" or "under," "under the element" as well as "on the element" can be included based on the element.

A variable lens may be a variable focus lens. Further, a variable lens may be a lens that is adjustable in focus. A variable lens may be at least one of a liquid lens, a polymer lens, a liquid-crystal lens, a voice coil motor (VCM) type, or a shape memory alloy (SMA) type. A liquid lens may include a liquid lens including a single liquid and a liquid lens including two liquids. A liquid lens including a single liquid may change the focus by adjusting a membrane disposed at a position corresponding to the liquid, for example, by pressing the membrane using the electromagnetic force between a magnet and a coil. A liquid lens including two liquids may include a conductive liquid and a non-conductive liquid, and may adjust the interface formed between the conductive liquid and the non-conductive liquid using the voltage applied to the liquid lens. A polymer lens may change the focus by controlling a polymer material using a driving unit such as a piezo actuator. A liquid-crystal lens may change the focus by controlling a liquid crystal using electromagnetic force. A VCM type may change the focus by adjusting a solid lens or a lens assembly including a solid lens using the electromagnetic force between a magnet and a coil. An SMA type may change the focus by controlling a solid lens or a lens assembly including a solid lens using a shape memory alloy.

Hereinafter, a variable lens to be controlled by a control device according to an embodiment will be described as being a liquid lens. However, the following description may also apply to the case in which the control device according to the embodiment controls variable lenses other than a liquid lens.

Hereinafter, a liquid lens 142, which is an object to be controlled, and a camera module 100 including the liquid lens 142 will be described with reference to the accompanying drawings prior to describing a liquid lens control device 200 according to an embodiment.

FIG. 1 is a schematic cross-sectional view of a camera module 100 according to an embodiment.

Referring to FIG. 1, the camera module 100 may include a lens assembly 22, a control circuit 24, and an image sensor 26.

The lens assembly 22 may include at least one lens unit. The at least one lens unit may include first and second lenses and a liquid lens unit (or a liquid lens module).

The control circuit 24 serves to control a lens unit, e.g. a liquid lens unit, and to supply a driving voltage (or an operating voltage) for driving the liquid lens unit. The control circuit 24 may be implemented in the form of an integrated circuit (IC). The control circuit 24 may include a liquid lens control device 200 to be described later.

The image sensor 26 may function to convert light that has passed through the first lens, the liquid lens unit, and the second lens into image data. More specifically, the image sensor 26 may convert light into analog signals through a pixel array including a plurality of pixels, and may synthesize digital signals corresponding to the analog signals to generate image data.

The control circuit 24 and the image sensor 26 described above may be disposed on a single printed circuit board (PCB). However, this is merely exemplary, and the embodiments are not limited thereto.

When the camera module 100 is applied to an optical device (or an optical instrument), the configuration of the control circuit 24 may be designed differently depending on the specifications required for the optical device. In particular, the control circuit 24 may be implemented as a single chip having the form of an integrated circuit (IC).

The first lens may be disposed on the lens assembly 22, and may be a region on which light is incident from outside the lens assembly 22. The first lens may be implemented as a single lens, or may be implemented as two or more lenses that are aligned with a central axis to form an optical system. Here, the central axis may be an optical axis LX of an optical system that is formed by the first lens, the liquid lens unit, and the second lens included in the camera module 100, or may be an axis parallel to the optical axis LX. The optical axis LX may correspond to the optical axis of the image sensor 26. That is, the first lens, the liquid lens unit, the second lens, and the image sensor 26 may be disposed so as to be aligned with the optical axis LX through active alignment (AA). Here, the active alignment may be the operation of aligning the optical axis of each of the first lens, the second lens, and the liquid lens unit with the optical axis of the image sensor 26.

The second lens may be disposed under the liquid lens unit. The second lens may be spaced apart from the first lens in the optical-axis direction.

The light incident on the first lens from outside the camera module 100 may pass through the liquid lens unit, and may be incident on the second lens. The second lens may be implemented as a single lens, or may be implemented as two or more lenses that are aligned with the central axis to form an optical system.

Unlike the liquid lens unit, each of the first lens and the second lens may be a solid lens, and may be formed of plastic. However, the embodiments are not limited as to the specific material of each of the first lens and the second lens.

Figure 2:
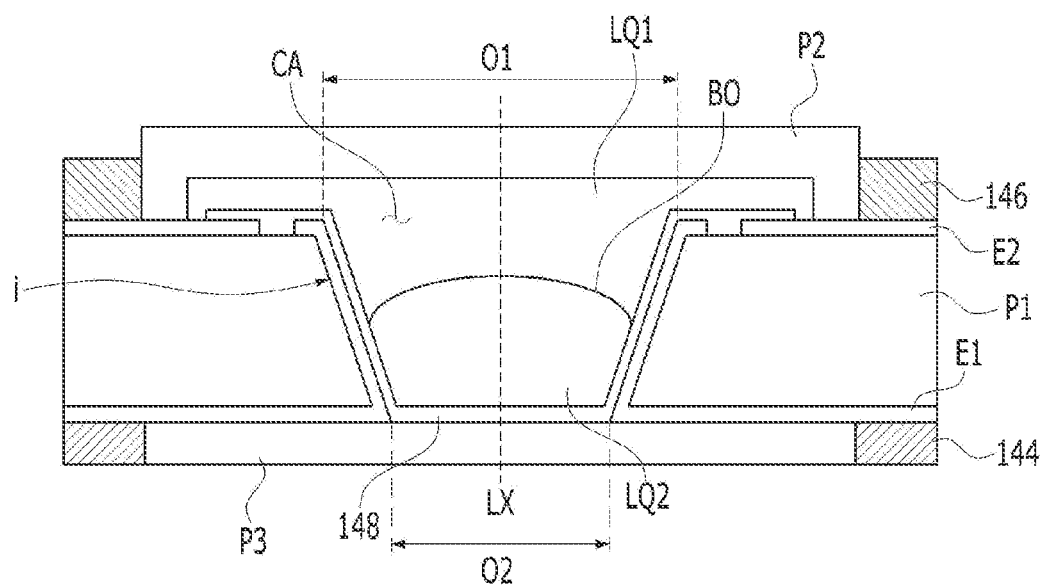
FIG. 2 is a cross-sectional view of a liquid lens unit.

FIG. 2 is a cross-sectional view of a general liquid lens unit.

The liquid lens unit shown in FIG. 2 may include a first connection substrate (or an individual electrode connection substrate) 144, a liquid lens (or a liquid lens body), and a second connection substrate (or a common electrode connection substrate) 146.

The liquid lens may include a plurality of different kinds of liquids LQ1 and LQ2, first to third plates P1, P2, and P3, first and second electrodes E1 and E2, and an insulating layer 148.

The plurality of liquids LQ1 and LQ2 may be accommodated in a cavity CA, and may include a first liquid LQ1, which is conductive, and a second liquid (or an insulating liquid) LQ2, which is not conductive. The first liquid LQ1 and the second liquid LQ2 may be immiscible with each other, and an interface BO may be formed at the contact portion between the first liquid LQ1 and the second liquid LQ2. For example, the first liquid LQ1 may be disposed on the second liquid LQ2, but the embodiments are not limited thereto.

The inner surface of the first plate P1 may form a sidewall i of the cavity CA. The first plate P1 may include upper and lower openings having a predetermined inclined surface. That is, the cavity CA may be defined as a region surrounded by the inclined surface i of the first plate P1, the first opening contacting the second plate P2, and the second opening contacting the third plate P3.

The diameter of the opening that is larger, among the first opening and the second opening, may vary depending on the field of view (FOV) required for the liquid lens or the role that the liquid lens plays in the camera module 100. The size (or the area or the width) of the first opening O1 may be greater than the size (or the area or the width) of the second opening O2. Here, the size of each of the first opening and the second opening may be the cross-sectional area in the horizontal direction. For example, when each of the first and second openings has a circular cross-section, the size thereof may be a radius, and when each of the first and second openings has a square cross-section, the size thereof may be a diagonal length.

Each of the first and second openings may have the shape of a hole having a circular cross-section. The interface BO formed between the two liquids may be moved along the inclined surface i of the cavity CA by the driving voltage applied to the liquid lens.

The first liquid LQ1 and the second liquid LQ2 are charged, accommodated, or disposed in the cavity CA in the first plate P1. In addition, the cavity CA is a portion through which the light that has passed through the first lens passes. Therefore, the first plate P1 may be formed of a transparent material, or may include impurities so that light does not easily pass therethrough.

Electrodes may be disposed on one surface and another surface of the first plate P1. A plurality of first electrodes E1 may be spaced apart from a second electrode E2, and may be disposed on one surface (e.g. the lower surface, the side surface, or the upper surface) of the first plate P1. The second electrode E2 may be disposed on at least a portion of the other surface (e.g. the upper surface) of the first plate P1, and may be in direct contact with the first liquid LQ1.

In addition, the first electrode E1 may be implemented as a plurality of electrodes (hereinafter referred to as "individual electrodes"), and the second electrode E2 may be implemented as a single electrode (hereinafter referred to as a "common electrode").

A portion of the second electrode E2 that disposed on the other surface of the first plate P1 may be exposed to the first liquid LQ1, which is conductive.

Each of the first and second electrodes E1 and E2 may be formed of a conductive material.

In addition, the second plate P2 may be disposed on one surface of the second electrode E2. That is, the second plate P2 may be disposed on the first plate P1. Specifically, the second plate P2 may be disposed on the upper surface of the second electrode E2 and the cavity CA.

The third plate P3 may be disposed on one surface of the first electrode E1. That is, the third plate P3 may be disposed under the first plate P1. Specifically, the third plate P3 may be disposed under the lower surface of the first electrode E1 and the cavity CA.

The second plate P2 and the third plate P3 may be disposed opposite each other, with the first plate P1 interposed therebetween. At least one of the second plate P2 or the third plate P3 may be omitted.

At least one of the second plate P2 or the third plate P3 may have a rectangular planar shape. Each of the second and third plates P2 and P3 may be a region through which light passes, and may be formed of a light-transmissive material. For example, each of the second and third plates P2 and P3 may be formed of glass. The second and third plates and P3 may be formed of the same material as each other for convenience of processing.

In one example, light may be incident on the second plate P2 from the first lens. That is, in the cavity CA, the area of the first opening, which faces the direction from which light is incident, may be greater than the area of the second opening, which faces the opposite direction. To this end, the second plate P2 may have a configuration that allows light to travel into the cavity CA. The third plate P3 may have a configuration that allows the light that has passed through the cavity CA in the first plate P1 to travel to the second lens.

In another example, light may be incident on the third plate P3 from the first lens. That is, in the cavity CA, the area of the second opening, which faces the direction from which light is incident, may be less than the area of the first opening, which faces the opposite direction. To this end, the third plate P3 may have a configuration that allows light to travel into the cavity CA. The second plate P2 may have a configuration that allows the light that has passed through the cavity CA in the first plate P1 to travel to the second lens.

The second plate P2 may be in direct contact with the first liquid LQ1.

The insulating layer 148 may be disposed so as to cover a portion of the upper surface of the third plate P3 under the cavity CA. That is, the insulating layer 148 may be disposed between the second liquid LQ2 and the third plate P3.

In addition, the insulating layer 148 may be disposed so as to cover the portion of the first electrode E1 that forms the sidewall of the cavity CA. In addition, the insulating layer 148 may be disposed so as to cover a portion of the second electrode E2, the first plate P1, and the first electrode E1 on the upper surface of the first plate P1. Accordingly, contact between the first electrode E1 and the first liquid LQ1 and contact between the first electrode E1 and the second liquid LQ2 may be prevented by the insulating layer 148.

The insulating layer 148 may cover one (e.g. the first electrode E1) of the first and second electrodes E1 and E2, and may expose a portion of the other one thereof (e.g. the second electrode E2), so that electric energy is applied to the first liquid LQ1, which is conductive.

The first connection substrate 144 may electrically connect the plurality of first electrodes 144 included in the liquid lens to a main board (not shown). The second connection substrate 146 may electrically connect the second electrode E2 of the liquid lens to the main board. To this end, the first connection substrate 144 may be implemented as a flexible printed circuit board (FPCB), and the second connection substrate 146 may be implemented as an FPCB or a single metal substrate (a conductive metal plate).

The first connection substrate 144 may be electrically connected to an electrode pad formed on the main board via a connection pad electrically connected to each of the plurality of first electrodes E1.

The second connection substrate 146 may be electrically connected to an electrode pad formed on the main board via a connection pad electrically connected to the second electrode E2.

The main board may include a recess, in which the image sensor 26 may be mounted, seated, tightly fitted, fixed, provisionally fixed, supported, coupled, or accommodated, and a circuit element (not shown). The circuit element of the main board may constitute a liquid lens control device 200 for controlling the liquid lens, which will be described later. The liquid lens control device 200 will be described later with reference to FIG. 4. The circuit element may include at least one of a passive element or an active element, and may have any of various areas and heights.

The main board may be implemented as a rigid flexible printed circuit board (RFPCB) including an FPCB. The FPCB may be bent according to the requirements of the space in which the camera module 100 is mounted.

Figure 3:
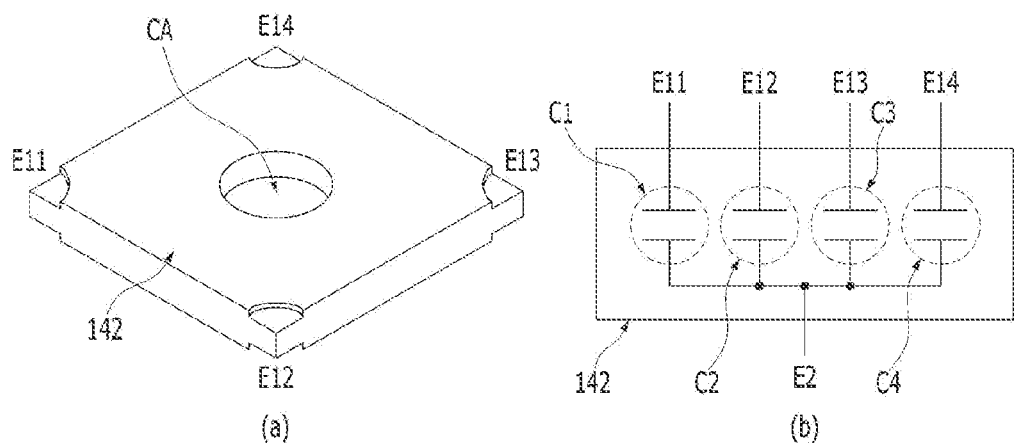
FIGS. 3(a) and (b) are views for explaining a liquid lens, the interface of which is adjusted in response to a driving voltage.

FIGS. 3(a) and (b) are views for explaining the liquid lens 142, the interface of which is adjusted in response to a driving voltage. Specifically, FIG. 3(a) is a perspective view of the liquid lens 142 included in the lens assembly 22, and FIG. 3(b) illustrates an equivalent circuit of the liquid lens 142. Here, the liquid lens 142 may correspond to the liquid lens shown in FIG. 2.

Referring to FIG. 3(a), the liquid lens 142, the interface BO of which is adjusted in shape in response to a driving voltage, may receive individual voltages through a plurality of individual electrodes, which are disposed at the same angular interval from each other in four different directions. The individual electrodes may be disposed at the same angular interval from each other with respect to the central axis of the liquid lens 142. Although it is illustrated in FIG. 3(a) that four individual electrodes E11, E12, E13, and E14 are respectively disposed at the four corners, the embodiments are not limited thereto. Further, the liquid lens 142 may receive a common voltage through a common electrode E2.

The shape of the interface BO between the first liquid LQ1 and the second liquid LQ2, which are disposed in the cavity CA, may be changed by the driving voltage formed by the interaction between the individual voltages applied through the plurality of individual electrodes E11, E12, E13, and E14 and the common voltage applied through the common electrode E2. The shape and deformation of the interface BO between the first liquid LQ1 and the second liquid LQ2 may be controlled by the liquid lens control device 200 shown in FIG. 4, which will be described later, in order to implement at least one of the AF function or the OIS function.

In addition, referring to FIG. 3(b), the liquid lens 142 may be constituted by a plurality of capacitors C1, C2, C3, and C4, one side of each of which receives an operating voltage from a corresponding one of the individual electrodes E11, E12, E13, and E14, which are different from each other, and the opposite side of each of which is connected to the common electrode E2. Here, each of the plurality of capacitors C1, C2, C3, and C4 included in the equivalent circuit may have a low capacitance of about several tens to 200 picofarads (pF).

Hereinafter, the operation of the liquid lens 142 configured as described above will be described in detail.

The first connection substrate 144 and the second connection substrate 146 serve to supply a driving voltage for driving the liquid lens 142 to the first and second electrodes E1 and E2, respectively. When the driving voltage is applied to the first and second electrodes E1 and E2 through the first connection substrate 144 and the second connection substrate 146, the interface BO between the first liquid LQ1 and the second liquid LQ2 may be deformed, and at least one of the shape, such as the curvature, the focal length, or the tilting angle of the liquid lens 142 may be changed (or adjusted). For example, the focal length of the liquid lens 142 may be adjusted with a change in at least one of the flexure or the inclination of the interface BO formed in the liquid lens 142 according to the driving voltage. In this manner, when the deformation, the radius of curvature, and the tilting angle of the interface BO are controlled, the camera module 100 including the liquid lens 142 may perform the auto-focusing (AF) function and the hand-tremor compensation or optical image stabilization (OIS) function.

For example, the first connection substrate 144 may respectively transmit four different individual voltages, namely first to fourth individual voltages, to the first to fourth individual electrodes E11, E12, E13, and E14 of the liquid lens 142, and the second connection substrate 146 may transmit one common voltage to the common electrode E2 of the liquid lens 142. The common voltage may include DC voltage or AC voltage. When the common voltage is applied in the form of a pulse, the width or duty cycle of the pulse may be constant.

Although not shown, a conductive epoxy may be disposed between the first connection substrate 144 and the plurality of first electrodes E1 so that the first connection substrate 144 and the plurality of first electrodes E1 are in contact with, coupled to, and electrically connected to each other. In addition, a conductive epoxy may be disposed between the second connection substrate 146 and the second electrode E2 so that the second connection substrate 146 and the second electrode E2 are in contact with, coupled to, and electrically connected to each other.

Hereinafter, the liquid lens control device 200 according to the embodiment will be described with reference to the accompanying drawings. The following description will be made on the assumption that the number of the plurality of individual electrodes E1 is four, but the embodiments are not limited thereto. That is, the following description may also apply to the case in which the number of the plurality of individual electrodes E1 is greater than or less than four.

Figure 4:
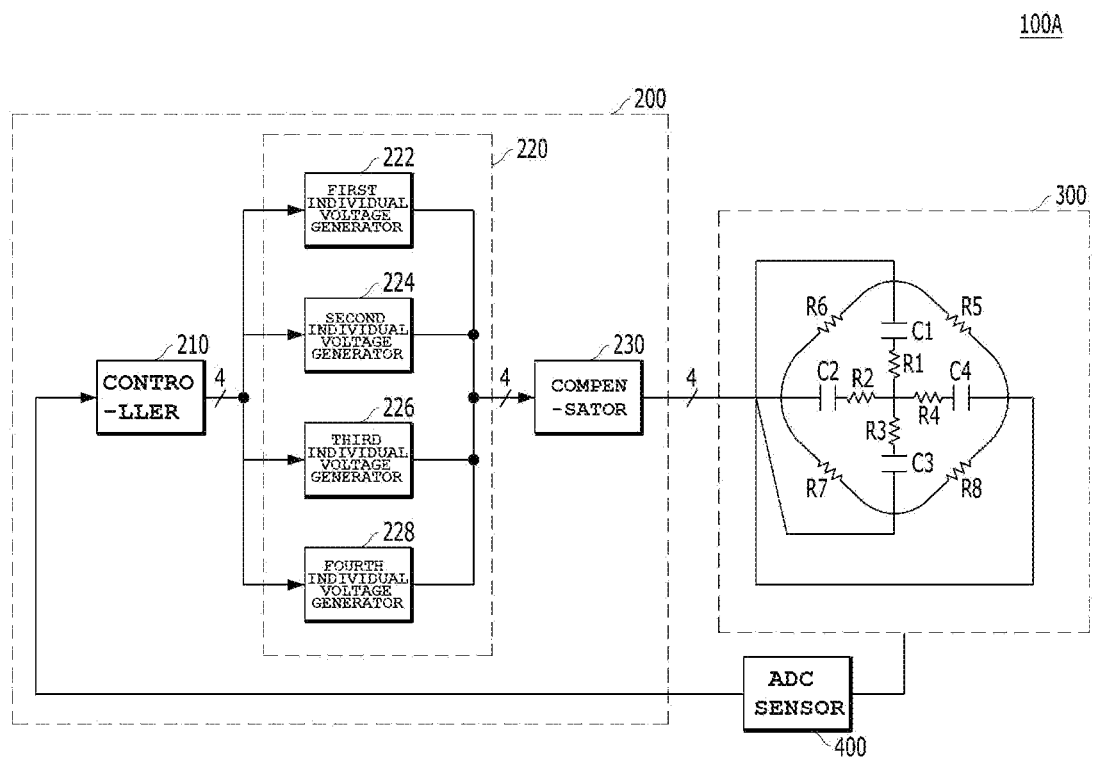
FIG. 4 a block diagram of the camera module according to the embodiment.

FIG. 4 is a block diagram of a camera module 100A according to an embodiment.

The camera module 100A shown in FIG. 4 may correspond to the embodiment of the camera module 100 shown in FIG. 1, and may include a liquid lens control device 200 and a liquid lens 300.

The liquid lens control device 200 shown in FIG. 4 may include a controller 210, a driving voltage generator 220, and a compensator 230. Although the compensator 230 is illustrated as being a separate component, the same may be included in the controller 210.

The liquid lens control device 200 serves to control the liquid lens 300, which operates in response to a driving signal. Here, the liquid lens 300 may correspond to the liquid lens 142 shown in FIGS. 2, 3(a), and 3(b) described above, but the embodiments are not limited thereto. That is, according to another embodiment, the liquid lens control device 200 according to the embodiment may also control a liquid lens configured differently from the liquid lens 142 shown in FIGS. 2, 3(a), and 3(b).

The capacitors C1, C2, C3, and C4 included in the liquid lens 300 shown in FIG. 4 respectively correspond to the capacitors C1, C2, C3, and C4 shown in FIG. 3(b), and the resistors R1 to R8 correspond to the parasitic resistors of the liquid lens 300.

Hereinafter, for better understanding, the liquid lens 300, which is controlled by the liquid lens control device 200 according to the embodiment, will be described as being the liquid lens 142 shown in FIGS. 2, 3(a), and 3(b). Also, although not shown in FIG. 4, the common voltage may be supplied from the liquid lens control device 200 to the liquid lens 300.

The driving voltage generator 220 may generate individual voltages to be respectively provided to the plurality of individual electrodes E11, E12, E13, and E14 in response to the control signal output from the controller 210, and may output the generated individual voltages to the compensator 230. Also, although not shown, the compensator 230 may perform compensation operation in front of the controller 210, and may output a compensation signal to the controller 210. Alternatively, the compensator 230 may be disposed between the controller 210 and the driving voltage generator 220 to compensate for the signal received from the controller 210, and may output a compensation signal to the driving voltage generator 220. The compensator 230 may perform compensation between the controller 210 and an ADC sensor, and may output a compensation signal to the controller 210. Alternatively, the compensator 230 may be included in the controller 210.

To this end, the driving voltage generator 220 may include a plurality of individual voltage generators, for example, first to fourth individual voltage generators 222 to 228.

The first individual voltage generator 222 may generate a first individual voltage to be provided to the first individual electrode E11 in response to the control signal output from the controller 210, and may output the generated first individual voltage to the compensator 230. The second individual voltage generator 224 may generate a second individual voltage to be provided to the second individual electrode E12 in response to the control signal output from the controller 210, and may output the generated second individual voltage to the compensator 230. The third individual voltage generator 226 may generate a third individual voltage to be provided to the third individual electrode E13 in response to the control signal output from the controller 210, and may output the generated third individual voltage to the compensator 230. The fourth individual voltage generator 228 may generate a fourth individual voltage to be provided to the fourth individual electrode E14 in response to the control signal output from the controller 210, and may output the generated fourth individual voltage to the compensator 230.

Also, the compensator 230 may perform compensation (ADC gain compensation) on the signal output from the ADC sensor, and the controller 210 may control the driving voltage generator 220 in response to the compensated signal. Also, the signal output from the controller 210 may be compensated for by the compensator 230 so as to be used to control the driving voltage generator 220.

The individual voltages output from the driving voltage generator 220 may be pulse-type voltages having a predetermined width, which are applied to the respective individual electrodes of the liquid lens 300. The driving voltage applied to the liquid lens 300 is the difference between the voltage applied to each of the plurality of individual electrodes E11, E12, E13, and E14 and the voltage applied to the common electrode E2.

Although not shown, the driving voltage generator 220 may further include at least one of a voltage booster (not shown), a voltage stabilizer (not shown), or a switching unit (not shown). The voltage booster serves to increase the magnitude of voltage that is supplied, and the voltage stabilizer serves to stabilize the output from the voltage booster. In addition, the switching unit serves to selectively supply the output from the voltage booster to each terminal of the liquid lens 300. Here, the switching unit may include a circuit structure called an H bridge. The high voltage output from the voltage booster may be applied to the switching unit as a power supply voltage. The switching unit may selectively supply the applied power supply voltage and a reference potential (e.g. a ground voltage) across the two ends of the liquid lens 300. The two ends of the liquid lens 300 may respectively be any one of the plurality of individual electrodes (e.g. E11, E12, E13, and E14) and the second electrode E2.

Meanwhile, the controller 210 may have a configuration for performing the AF function and the OIS function, and may control the liquid lens 300 included in the lens assembly 22 in response to a user request or a result of sensing (e.g. a motion signal of a gyro sensor (not shown) or the like).

In addition, the controller 210 may receive information (i.e. information about the distance to an object) for performing the AF function from the inside (e.g. the image sensor 26) or the outside (e.g. a distance sensor or an application processor) of the optical device or the camera module 100 or 100A, may calculate a driving voltage corresponding to the shape that the liquid lens 300 needs to have according to the focal length for focusing the lens on the object using the distance information, and may generate a control signal based thereon.

In addition, the controller 210 may output a control signal using a motion signal of the liquid lens or the optical device including the liquid lens, which is output from the gyro sensor, and may output the output control signal to the driving voltage generator 220.

Although not shown, in order to implement the OIS function, the controller 210 may further include a low-pass filter (LPF) (not shown). The LPF may extract only a desired band by removing a high-frequency noise component from a motion signal output from the gyro sensor, may calculate the amount of hand tremor using the denoised motion signal, may calculate a driving voltage corresponding to the shape that the liquid lens 300 needs to have in order to compensate for the calculated amount of hand tremor, and may generate a control signal based thereon.

Hereinafter, the configuration and operation of the controller 210 of the liquid lens control device 200 according to the embodiment will be described with reference to the accompanying drawings.

Figure 5:
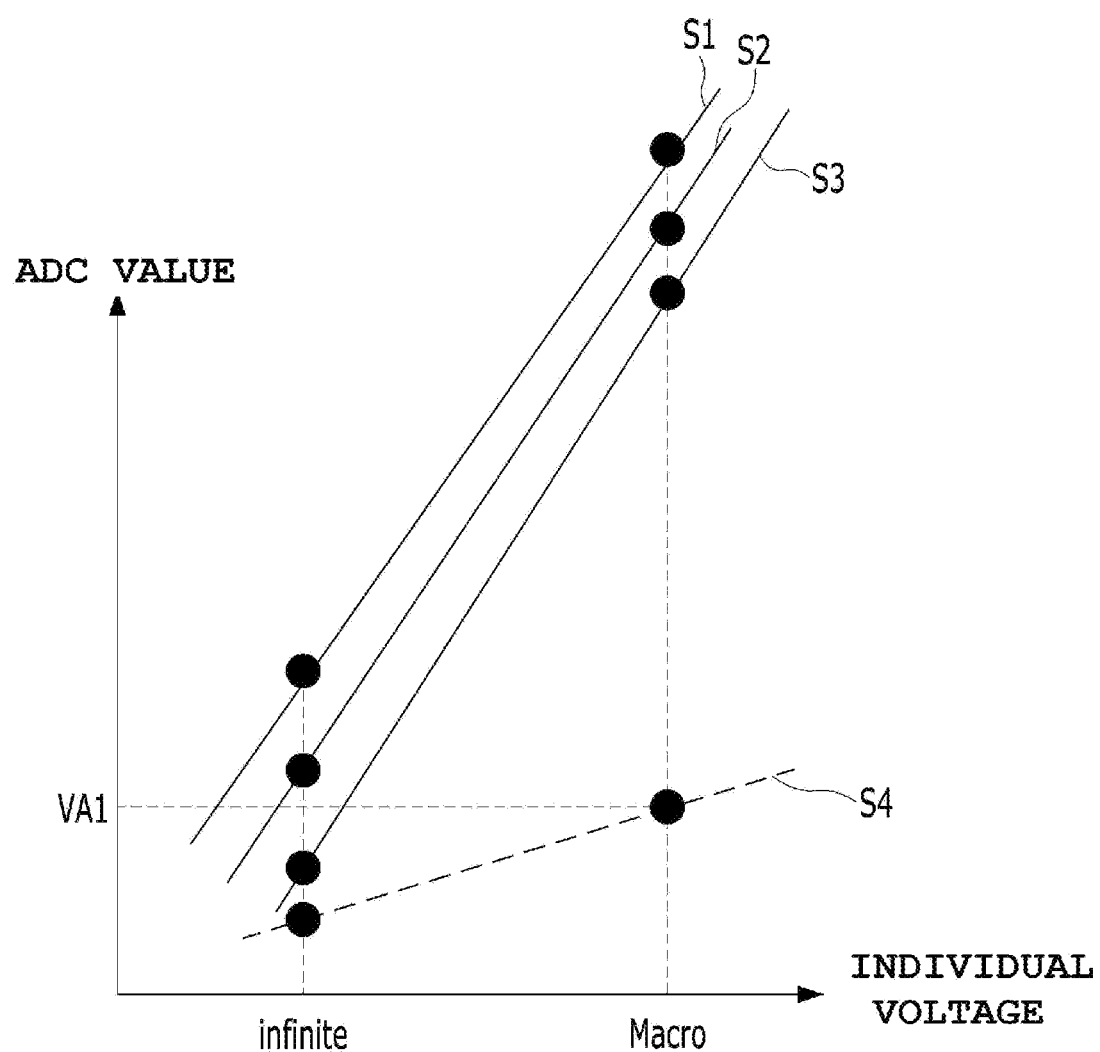
FIG. 5 is a graph showing an ADC value for each of individual voltages applied to respective ones of individual electrodes before correction.
Figure 6:
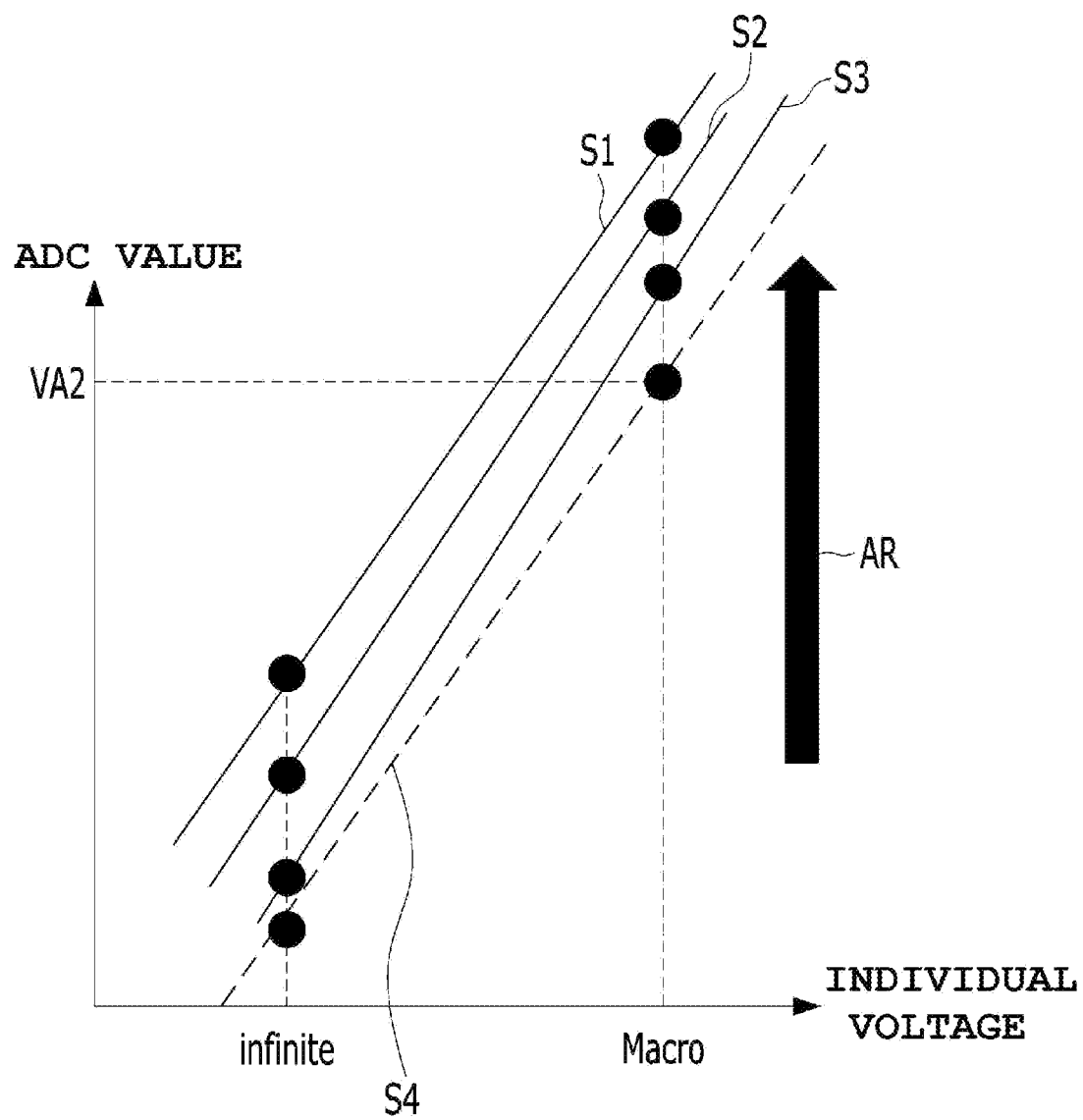
FIG. 6 is a graph showing an ADC value for each of individual voltages after correction.

FIG. 5 is a graph showing information corresponding to the position of the liquid interface with respect to the individual voltages applied to the individual electrodes (e.g. a value obtained by performing analog-to-digital conversion (ADC) on the capacitance value corresponding to the liquid lens interface or the capacitance value between each individual electrode and the common electrode) before correcting variation in the liquid interface or the ADC value corresponding to the liquid interface according to the voltage applied to each individual electrode. FIG. 6 is a graph showing information corresponding to the position of the liquid interface with respect to the individual voltages (e.g. a value obtained by performing ADC on the capacitance value corresponding to the liquid lens interface or the capacitance value between each individual electrode and the common electrode) after correcting variation in the liquid interface or the value (e.g. the ADC value) corresponding to the liquid interface according to the voltage applied to each individual electrode. In each graph, the horizontal axis represents the effective value of the individual voltage, and the vertical axis represents the ADC value of the capacitance corresponding to the liquid interface. In each of FIGS. 5 and 6, each of the effective value of the individual voltage and the ADC value may take the form of code.

The controller 210 may calculate a plurality of first slopes, each of which is the slope of the ADC value corresponding to the position of the liquid interface BO of the liquid lens 300 with respect to the individual voltage applied to each of the plurality of individual electrodes E11, E12, E13, and E14. For example, the controller 210 may acquire the graph shown in FIG. 5.

To this end, the camera module 100A may further include an ADC sensor 400. The ADC sensor 400 is illustrated in FIG. 4 as being disposed outside the liquid lens control device 200 or separately therefrom. However, according to another embodiment, the ADC sensor 400 may belong to the liquid lens control device 200 or the controller 210.

The ADC sensor 400 senses an ADC value corresponding to the position of the liquid interface BO of the liquid lens 300 for each individual electrode, and outputs the result of sensing to the controller 210. For example, the ADC sensor 400 may apply a voltage across the two ends of the insulating layer 148 shown in FIG. 2, may sense the capacitance values of the capacitors C1 to C4 shown in FIG. 3(b), and may sense the ADC value for each individual voltage. Only one ADC sensor 400 may be provided. When a single ADC sensor 400 is provided, the ADC sensor 400 may convert the ADC values received from the plurality of individual electrodes into a representative value, and may output the representative value. The representative value may be, for example, a value corresponding to the average of capacitance or ADC values of the individual electrodes. Also, when a single ADC sensor 400 is provided, the ADC sensor 400 may acquire the capacitance of the liquid lens from the common electrode at a time. Alternatively, the ADC sensor 400 may be provided in a plural number. For example, the number of ADC sensors 400 may correspond to the number of the plurality of individual electrodes. In this case, each of the ADC sensors 400 may acquire a capacitance value corresponding to a respective one of the individual electrodes.

For example, referring to FIG. 5, when the first to fourth individual voltages are respectively applied to the first to fourth individual electrodes E11, E12, E13, and E14, the capacitance value of each of the individual electrodes may vary. Variation may occur for various reasons. For example, variation may occur due to structural tolerance in components (the electrodes, the insulating layer, etc.) of the liquid lens, which occurs during processing. Variation in each individual electrode makes it difficult to accurately control the liquid lens. Therefore, the embodiment uses the compensator for compensating for variation in the liquid interface according to application of voltage to each individual electrode, thereby more accurately controlling the liquid lens 300.

FIG. 4 shows an embodiment in which a single compensator 230 compensates values output from a plurality of individual voltage generators. The deviation between the plurality of individual voltages may be compensated for by the compensator 230, and the compensated individual voltages may be applied to the liquid lens 300. Although not shown, a single compensator 230 may be located in front of the controller 210, between the individual voltage generators and the controller 210, or between the ADC sensor 400 and the controller 210. Alternatively, the compensator 230 may be included in the controller 210.

An embodiment of compensation method will be described with reference to FIGS. 5 to 7. Referring to FIG. 5, when the first to fourth individual voltages are respectively applied to the first to fourth individual electrodes E11, E12, E13, and E14, the compensator 230 or the controller 210 may calculate a first slope S1 of the ADC value for the first individual voltage (hereinafter referred to as a "$1\text{-}1^{st}$ slope"), may calculate a first slope S2 of the ADC value for the second individual voltage (hereinafter referred to as a "$1\text{-}2^{nd}$ slope"), may calculate a first slope S3 of the ADC value for the third individual voltage (hereinafter referred to as a "$1\text{-}3^{rd}$ slope"), and may calculate a first slope S4 of the ADC value for the fourth individual voltage (hereinafter referred to as a "$1\text{-}4^{th}$ slope").

Each S of the $1\text{-}1^{st}$ to $1\text{-}4^{th}$ slopes S1 to S4 may be expressed using Equation 1 below.

$$S = (ADCm - ADCi)/(VLm - VLi) \qquad \text{[Equation 1]}$$

Here, ADCm represents a value corresponding to the ADC value at a macro position, VLm represents a value corresponding to the individual voltage at the macro position, ADCi represents a value corresponding to the ADC value at an infinite position, and VLi represents a value corresponding to the individual voltage at the infinite position.

Referring to Equation 1, it can be seen that the first slope S is a slope between the infinite position i and the macro position m.

According to the embodiment, the compensator 230 may perform an operation of calculating a plurality of first slopes in response to a power-on signal or an application-on signal. Here, the power-on signal may be a signal for supplying operating power of the camera module 100A, and the application-on signal may be a signal that is generated when it is desired to correct deviation between the first slopes for each individual electrode in the camera module 100A.

Also, the compensator 230 may calculate a reference slope using at least two of the plurality of first slopes S1 to S4.

For example, the compensator 230 may calculate the average value of the plurality of first slopes S1 to S4 as a reference slope (hereinafter referred to as a "first reference slope"). The first reference slope may be expressed using Equation 2 below.

$$RS1 = \text{Average}(S1, S2, S3, S4) \quad \text{[Equation 2]}$$

Here, RS1 represents the first reference slope, and Average (S1, S2, S3, S4) represents the average value of S1 to S4.

Also, the compensator 230 may correct at least one first slope (hereinafter referred to as a "correction target slope") among the plurality of first slopes S1 to S4 based on the reference slope.

For example, as shown in Equation 3 below, the absolute values D1 to D4 of the difference between the $1-1^{st}$ to $1-4^{th}$ slopes S1 to S4 and the first reference slope RS1 may be obtained, and a slope corresponding to an absolute value larger than a predetermined value (e.g. 1.0) among the absolute values may be determined to be the correction target slope.

$$D1 = ABS(RS1-S1)$$
$$D2 = ABS(RS1-S2)$$
$$D3 = ABS(RS1-S3)$$
$$D4 = ABS(RS1-S4) \quad \text{[Equation 3]}$$

Here, D1 represents the absolute value ABS of the difference between the $1-1^{st}$ slope S1 and the first reference slope RS1, D2 represents the absolute value ABS of the difference between the $1-2^{nd}$ slope S2 and the first reference slope RS1, D3 represents the absolute value ABS of the difference between the $1-3^{rd}$ slope S3 and the first reference slope RS1, and D4 represents the absolute value ABS of the difference between the $1-4^{th}$ slope S4 and the first reference slope RS1.

As described above, at least one first slope among the plurality of first slopes S1 to S4 may become the correction target slope. One of the correction target slopes may be the slope having the largest deviation from the reference slope (e.g. the first reference slope) (hereinafter referred to as a "maximally deviating slope").

According to an embodiment, the maximally deviating slope may be any one of two first slopes, the difference (value) between the two neighboring ADC values of which is the largest at the macro position. Referring to FIG. 5, when the difference between the two neighboring ADC values of the $1-1^{st}$ slope S1 and the $1-2^{nd}$ slope S2 is referred to as a "first difference", when the difference between the two neighboring ADC values of the $1-2^{nd}$ slope S2 and the $1-3^{rd}$ slope S3 is referred to as a "second difference", and when the difference between the two neighboring ADC values of the $1-3^{rd}$ slope S3 and the $1-4^{th}$ slope S4 is referred to as a "third difference", the third difference the largest among the first to third differences. Accordingly, the maximally deviating slope may be any one of the $1-3^{rd}$ and $1-4^{th}$ slopes S3 and S4, for example, the $1-4^{th}$ slope S4.

According to another embodiment, among the $1-1^{st}$ to $1-4^{th}$ slopes S1 to S4, the maximally deviating slope may be the slope that is used for calculation of the largest value among D1 to D4 shown in Equation 3. In the case shown in FIG. 5, since D4 is the largest among D1 to D4, the $1-4^{th}$ slope S4, which is used for calculation of D4, may be determined to be the maximally deviating slope.

The compensator 230 may calculate the average value of the first slopes other than the maximally deviating slope, among the plurality of first slopes S1 to S4, as a reference slope (hereinafter referred to as a "second reference slope"). Alternatively, the compensator 230 may calculate the average value of slopes other than the correction target slope (hereinafter referred to as "non-corrected slopes") among the plurality of first slopes S1 to S4 as the second reference slope. The second reference slope may be expressed using Equation 4 below.

$$RS2 = \text{Average}(TS\_EX\_SM) \quad \text{[Equation 4]}$$

Here, RS2 represents the second reference slope, and Average (TS_EX_SM) represents the average value of the non-corrected slopes.

In addition, the correction target slope may be corrected as shown in Equation 5 below.

$$G = W \times F \quad \text{[Equation 5]}$$

Here, G represents a slope obtained by correcting the correction target slope, W represents a weight for realizing a theoretical value, and F may be expressed using Equation 6 below.

$$F = f \times CS \quad \text{[Equation 6]}$$

Here, f is expressed using Equation 7 below, and CS represents the correction target slope.

$$f = \frac{RS2}{CS} \quad \text{[Equation 7]}$$

According to the embodiment, the compensator 230 may correct the ADC value at the macro position of the individual electrode having the maximally deviating slope using the reference slope.

For example, the ADC value VA1 at the macro position of the maximally deviating slope S4 shown in FIG. 5 may be increased in the direction of the arrow to the ADC value VA2 at the macro position of the maximally deviating slope S4 shown in FIG. 6. In this manner, the maximally deviating slope S4 may be corrected.

Hereinafter, an embodiment 230A of the compensator 230 for correcting the correction target slope will be described with reference to FIG. 7. In addition, in order to help understanding the operation of correcting the correction target slope by the compensator 230, it is assumed that S1, S2, S3, and S4 shown in FIG. 5 are, respectively, 4, 4.2, 4.4, and 2.2 and that the predetermined value is "1".

Figure 7:
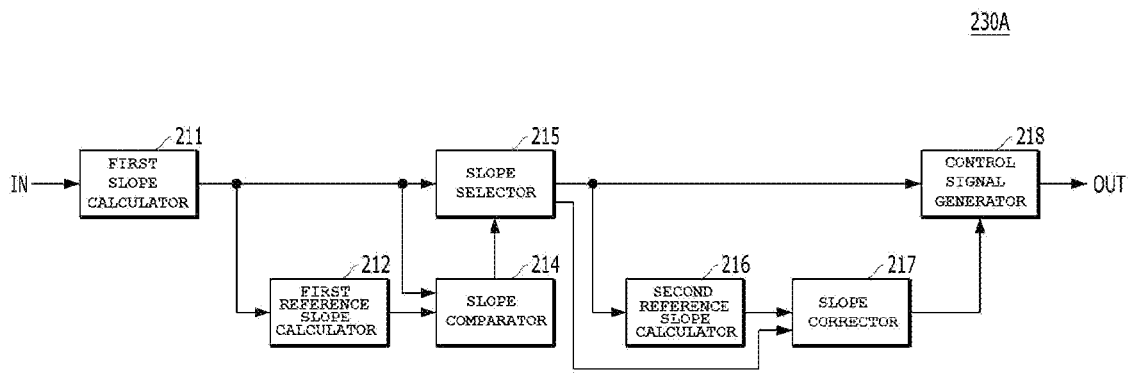
FIG. 7 is a block diagram of a correction method in a liquid lens control device according to an embodiment.

FIG. 7 is a block diagram of an embodiment 230A of the compensator 230 shown in FIG. 4. FIG. 7 may correspond to the case where the controller 210 includes the compensator 230 shown in FIG. 4.

The compensator 230A shown in FIG. 7 may include a first slope calculator 211, a first reference slope calculator 212, a slope comparator 214, a slope selector 215, a second reference slope calculator 216, a slope corrector 217, and a control signal generator 218.

The first slope calculator 211 may calculate a plurality of first slopes (e.g. S1 to S4) using the ADC values for the individual voltages, which are output from the ADC sensor 400 and received through an input terminal IN.

The first reference slope calculator 212 calculates the first reference slope RS1 expressed in Equation 2 above using the plurality of first slopes S1 to S4 output from the first slope calculator 211, and outputs the calculated first reference slope RS1, which is "3.7", to the slope comparator 214.

The slope comparator 214 calculates D1, D2, D3, and D4, expressed in Equation 3, using the plurality of first slopes S1 to S4 output from the first slope calculator 211 and the first reference slope RS1 output from the first reference slope calculator 212, and outputs the calculated and D4, which are, respectively, 0.3, 0.5, 0.7, and 1.5, to the slope selector 215.

The slope selector 215 compares each of D1 to D4 with the predetermined value, e.g. 1, selects a value larger than 1 from among D1 to D4, i.e. the $1-4^{th}$ slope S4 used to calculate D4, as the correction target slope, outputs the selected correction target slope to the slope corrector 217, and outputs a non-corrected slope to the second reference slope calculator 216.

The second reference slope calculator 216 calculates the second reference slope RS2 expressed in Equation 4 using the non-corrected slope output from the slope selector 215, and outputs the calculated second reference slope RS2, which is 4.2, to the slope corrector 217.

Thereafter, the slope corrector 217 obtains f (1.91=4.2/2.2), expressed in Equation 7, using S4, which is the correction target slope CS output from the slope selector 215, and the second reference slope RS2 output from the second reference slope calculator 216, and calculates F (4.2=1.91×2.2), expressed in Equation 6, using f and S4, which is the correction target slope CS. Thereafter, when the weight W is "1", the slope corrector 217 outputs 4.2, which is the slope G obtained by correcting the correction target slope S4, to the control signal generator 218 instead of S4.

The control signal generator 218 generates a control signal using S1 to S3 and 4.2, which is the corrected slope G, in place of S4, and outputs the generated control signal to the driving voltage generator 220 through an output terminal OUT.

Thereafter, the driving voltage generator 220 may generate plurality of individual voltages to be respectively supplied to the plurality of individual electrodes E11, E12, E13, and E14 in response to the control signal, which is output from the controller 210 or the compensator 230 and is generated based on the result G of correcting the correction target slope. That is, in response to the control signal, the driving voltage generator 220 compensates the individual voltages according to the extent to which the ADC values change, and outputs the compensated individual voltages to the compensator 230.

The driving voltage generator 220 may include a first driving voltage generator and a second driving voltage generator. The first driving voltage generator may generate an individual voltage to be applied to the individual electrode having the corrected correction target slope, among the plurality of first slopes, and the second driving voltage generator may generate individual voltages to be applied to the individual electrodes having the non-corrected slopes, other than the correction target slope, among the plurality of first slopes. In the example shown in FIGS. 5 and 6 described above, the fourth individual voltage generator 228 corresponds to the first driving voltage generator, and the first to third individual voltage generators 222 to 226 correspond to the second driving voltage generator.

Meanwhile, referring again to FIG. 4, the compensator 230 may multiply the plurality of individual voltages, which are generated by the first and second driving voltage generators, by the same compensation gain, and may apply the result thereof to the plurality of individual electrodes of the liquid lens 300.

Hereinafter, a liquid lens control device according to another embodiment will be described with reference to the accompanying drawings.

Figure 8:
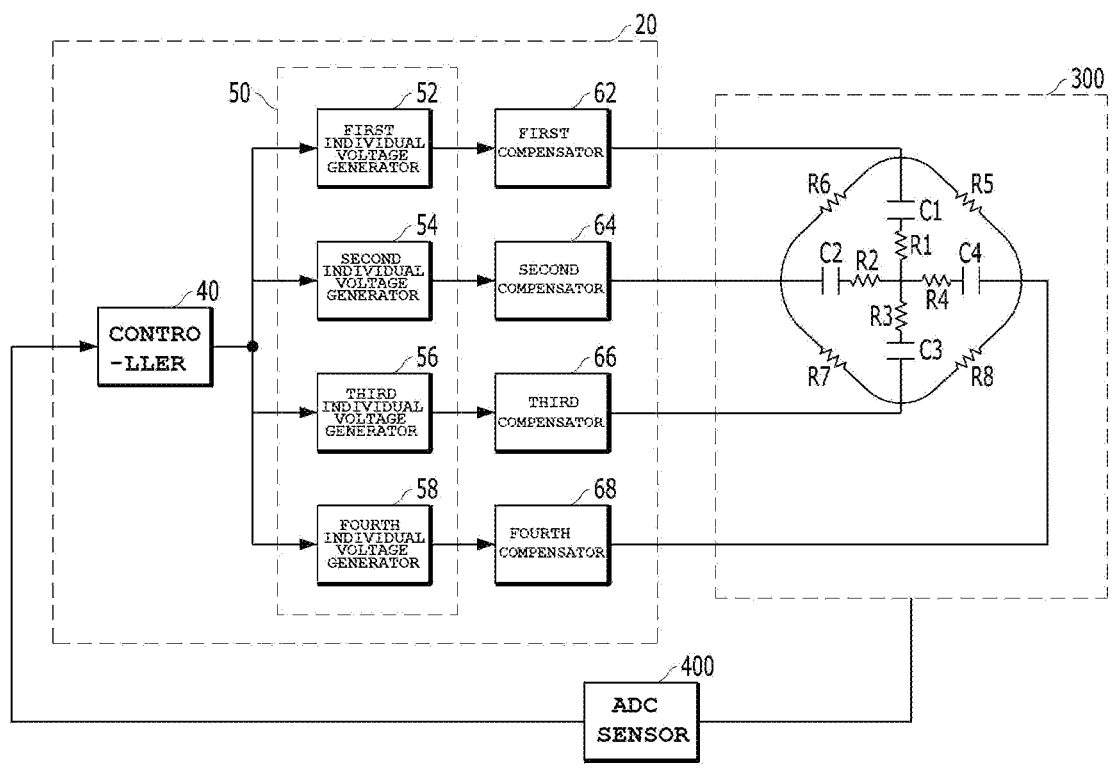
FIG. 8 is a block diagram of a liquid lens control device according to another embodiment.

FIG. 8 is a block diagram of a camera module according to another embodiment, which includes a liquid lens control device 20, a liquid lens 300, and an ADC sensor 400.

The liquid lens 300 and the ADC sensor 400 shown in FIG. 8 are the same as the liquid lens 300 and the ADC sensor 400 shown in FIG. 4, respectively. Thus, the same parts are denoted by the same reference numerals, and a duplicate description thereof will be omitted.

The liquid lens control device 20 according to the embodiment includes controller 40, a driving voltage generator 50, and first to fourth compensators 62 to 68. The driving voltage generator 50 generates a plurality of individual voltages to be supplied to the plurality of individual electrodes E11, E12, E13, and E14 in response to the control signal output from the controller 40. To this end, the driving voltage generator 50 includes first to fourth individual voltage generators 52 to 58. Here, the first to fourth individual voltage generators 52 to 58 perform the same functions as the first to fourth individual voltage generators 222 to 228 shown in FIG. 4, respectively.

The controller 40 of the liquid lens control device according to the embodiment may not correct the correction target slope. Accordingly, the controller 40 generates a control signal using the $1-1^{st}$ to $1-4^{th}$ slopes S1 to S4, which are different from each other, and the driving voltage generator 50 generates a plurality of individual voltages in response to the control signal. Although not shown, the compensators may be disposed between the controller 40 and the respective individual voltage generators, and may compensate the signal from the controller 40, thereby compensating for the deviation of each individual electrode.

In general, when the ADC values have large variation and are different from each other, individual voltages need to be generated so as to be suitable for the characteristics of the respective individual electrodes in order to secure spatial frequency response (SFR) and OIS performance. However, when only a single compensator is used to generate a plurality of individual voltages, SFR and OIS performance may be deteriorated. In order to prevent this, the liquid lens control device 50 according to the embodiment includes the plurality of first to fourth compensators 62 to 68. The first to fourth compensators 62 to 68 multiply the plurality of individual voltages, which may be different from each other, by different compensation gains, thereby compensating the correction target slope, among the plurality of first slopes S1 to S4.

Although only a limited number of embodiments have been described above, various other embodiments are possible. The technical contents of the above-described embodiments may be combined into various forms as long as they are not incompatible with one another, and thus may be implemented in new embodiments.

An optical device may be implemented using the camera module 100 or 100A including the liquid lens control device 200 according to the embodiments described above. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include the lens assembly.

In addition, the optical device may be implemented in a portable device such as, for example, a smartphone, a laptop computer, or a tablet computer. Such an optical device may include the camera module 100 or 100A, a display (not shown) configured to output an image, a battery (not shown) configured to supply power to the camera module 100 or 100A, and a body housing in which the camera module 100 or 100A, the display, and the battery are mounted. The optical device may further include a communication module capable of communicating with other devices and a memory unit capable of storing data. The communication module and the memory unit may also be mounted in the body housing.

It will be apparent to those skilled in the art that various changes in form and details may be made without departing from the spirit and the essential characteristics of the disclosure set forth herein. Accordingly, the above detailed description is not intended to be construed as limiting the disclosure in all aspects and to be considered by way of example. The scope of the disclosure should be determined by reasonable interpretation of the accompanying claims, and all equivalent modifications made without departing from the disclosure should be included in the scope of the disclosure.

Mode for Invention

Various embodiments have been described in the best mode for carrying out the disclosure.

INDUSTRIAL APPLICABILITY

A liquid lens control device according to the embodiments may be used in camera/video devices, telescopic devices, microscopic devices, an interferometer, a photometer, a polarimeter, a spectrometer, a reflectometer, an auto-collimator, a lens-meter, a smartphone, a laptop computer, a tablet computer, etc.

The invention claimed is:

1. A liquid lens control device, comprising:
a liquid lens configured to control an interface between liquids in response to a plurality of individual voltages applied to respective ones of a plurality of individual electrodes;
a controller configured to control the plurality of individual voltages; and
a compensator configured to compensate for a characteristic of at least one individual electrode among the plurality of individual electrodes,
wherein the compensator calculates a plurality of first slopes, each of the plurality of first slopes being a slope of an Analog-to-Digital Converter (ADC) value corresponding to a position of the interface between the liquids in the liquid lens with respect to the individual voltage for each of the plurality of individual electrodes, calculates a reference slope using at least two of the plurality of first slopes, and corrects at least one first slope, among the plurality of first slopes, using the reference slope, and
wherein one of the at least one first slope is a slope having a largest deviation from the reference slope.

2. The liquid lens control device according to claim 1, wherein the characteristic compensated for by the compensator is a position of the interface according to an individual voltage applied to the individual electrode.

3. The liquid lens control device according to claim 1, wherein the compensator performs compensation using a first ADC value, acquired when a first voltage is applied to each of the plurality of individual electrodes, and a second ADC value, acquired when a second voltage is applied to each of the plurality of individual electrodes, the second voltage being different from the first voltage.

4. The liquid lens control device according to claim 3, wherein the compensator performs compensation using a slope of a straight line connecting the first ADC value corresponding to the first voltage and the second ADC value corresponding to the second voltage for each of the plurality of individual electrodes.

5. The liquid lens control device according to claim 1, wherein the compensator includes a single compensator, and the single compensator compensates for the characteristic.

6. The liquid lens control device according to claim 1, wherein the compensator includes a plurality of compensators that respectively correspond to the individual electrodes, and each of the plurality of compensators compensates for a characteristic of the individual electrode corresponding to each of the compensators.

7. The liquid lens control device according to claim 1, wherein the reference slope is an average value of remaining slopes, other than the slope having the largest deviation, among the plurality of first slopes.

8. The liquid lens control device according to claim 1, comprising:
a first driving voltage generator configured to generate an individual voltage that is applied to an individual electrode having at least one corrected first slope among the plurality of first slopes;
a second driving voltage generator configured to generate an individual voltage that is applied to an individual electrode having a remaining slope, other than the at least one corrected first slope, among the plurality of first slopes; and
a compensator configured to multiply a plurality of individual voltages generated by the first and second driving voltage generators by a same compensation gain and to apply a result of multiplication to the plurality of individual electrodes.

9. The liquid lens control device according to claim 8, wherein the single compensator is located in front of the controller or is included in the controller.

10. A liquid lens control device, comprising
a liquid lens configured to control an interface between liquids in response to a plurality of individual voltages applied to respective ones of a plurality of individual electrodes;
a controller configured to control the plurality of individual voltages; and
a compensator configured to compensate for a characteristic of at least one individual electrode among the plurality of individual electrodes,
wherein the compensator is configured to:
calculate a plurality of first slopes, each of the plurality of first slopes being a slope of an Analog-to-Digital Converter (ADC) value corresponding to a position of the interface between the liquids in the liquid lens with respect to the individual voltage for each of the plurality of individual electrodes;

calculate an average value of the plurality of first slopes as a first reference slope;
calculate absolute values of the differences between the plurality of first slope and the first reference slope;
determine a slope corresponding to an absolute value larger than a predetermined value among the absolute values, as a correction target slope;
calculate a second reference slope using the plurality of first slopes; and
correct the correction target slope using the second reference slope.

11. The liquid lens control device according to claim 10, wherein the compensator calculates an average value of slopes other than the correction target slope among the plurality of first slopes, as the second reference slope.

12. The liquid lens control device according to claim 10, wherein the compensator determines, among the plurality of first slopes, a slope that is used for calculation of a largest value among the absolute values, as a maximally deviating slope.

13. The liquid lens control device according to claim 10, wherein the compensator determines, among the plurality of first slopes, any one of two first slopes, the difference between two neighboring ADC values of which is largest at a macro position, as a maximally deviating slope.

14. The liquid lens control device according to claim 12, wherein the compensator calculates an average value of the first slopes other than the maximally deviating slope, among the plurality of first slopes, as the second reference slope.

15. The liquid lens control device according to claim 10, wherein the compensator calculates the plurality of first slopes in response to a power-on signal or an application-on signal.

16. The liquid lens control device according to claim 6, wherein the plurality of compensators multiply the plurality of individual voltages by different compensation gains, thereby compensating for the characteristic of the individual electrode.

17. A liquid lens control device, comprising:
a liquid lens configured to control an interface between liquids in response to a plurality of individual voltages applied to respective ones of a plurality of individual electrodes;
a driving voltage generator configured to generate the plurality of individual voltages; and
a compensator configured to compensate for a deviation between the plurality of individual voltages output from the driving voltage generator, and applying the compensated individual voltages to the liquid lens,
wherein the compensator calculates a plurality of first slopes, each of the plurality of first slopes being a slope of an Analog-to-Digital Converter (ADC) value corresponding to a position of the interface between the liquids in the liquid lens with respect to the individual voltage for each of the plurality of individual electrodes, calculates a reference slope using at least two of the plurality of first slopes, and corrects at least one first slope, among the plurality of first slopes, using the reference slope, and
wherein one of the at least one first slope is a slope having a largest deviation from the reference slope.

18. The liquid lens control device according to claim 17, comprising an ADC sensor sensing the ADC value of the liquid lens for each individual electrode, and outputs the result of sensing to the compensator.

* * * * *